UNITED STATES PATENT OFFICE.

TOKUSABU R. SATOW, OF SANTA ANA, CALIFORNIA.

COMPOSITION FOR TREATING DISEASES OF TREES.

1,054,796.   Specification of Letters Patent.   Patented Mar. 4, 1913.

No Drawing.   Application filed May 13, 1912.   Serial No. 696,982.

*To all whom it may concern:*

Be it known that I, TOKUSABU R. SATOW, a subject of the Emperor of Japan, residing at Santa Ana, in the county of Orange and State of California, have invented a new and useful Composition for Treating Diseases of Trees, of which the following is a specification.

This invention relates more particularly to chemical compositions of matter used in the treatment of diseases of trees, and more specifically to that condition which exists in fruit trees and is known among horticulturists as gummosis, and a primal object of my invention is to provide a composition of matter applied to the affected part of a tree so that the abnormal condition above referred to will be removed, and the tree properly healed, thereby promoting a healthy growth and improving the qualities of the fruit grown thereon.

In numerous trees, and more especially, peach, apricot, plum, apple and other fruit producing trees, an abnormal condition has existed that has retarded the healthy growth of the tree and impaired the qualities of the fruit produced thereby. This condition, while not considered in itself a disease but rather an indication of unfavorable conditions, affects the thrifty growth and has been termed by well known writers such as "Wickson" as gummosis. This abnormal condition commonly presents itself in the form of gummy exudations and appears more frequently on the trunks of trees. As far as known these exudations are thought to result from a congealing of the tree sap, which instead of being forced upwardly into the trunk and branches for its proper nourishment and furthering the production of fruit thereon, has been retarded by unhealthy and unfavorable conditions of the roots and an improper fertilization of the soils adjacent thereto.

In treating an affected tree it is thought that the first step to be considered in the complete eradication of the abnormal condition, is a cultivation of the tree around the roots and a removal of excessive moisture. However the exact cause for this condition is not generally known as it affects trees of totally different varieties. By the employment of my composition and following the method of application herein set forth to the affected parts, this condition called gummosis will be effectively eradicated and the tree healed at the spots from which it exudes the gummy sap.

In the formation of my compound I preferably employ the following chemicals in approximately the proportions stated, however these proportions may be varied and the other chemicals may be used in lieu of the ones hereinafter stated, without departing in at least from the spirit of my invention: Sodium carbonate ($Na_2CO_3$) 15%, calcium oxid (CaO) 65%, sodium chlorid (NaCl) 20%.

In applying the above compounds an incision is first made at the point where the gums exude from the tree and about an inch of the bark around the affected part is removed. The exposed part is then cleansed by washing the same with clear water, after which the trunk of the tree at the place where the incision has been made is loosely wrapped with a fabric. The compound is then applied by placing the same on the affected part, the fabric preventing the compound from dropping off, and the fabric is then tightly bound around the tree with a securing means. The fabric is then saturated with water until the powder is thoroughly dissolved.

The calcium oxid (CaO) combines with the water, creating a high temperature, the sodium carbonate ($Na_2CO_3$) also combines to form a hydroxid but without creating heat, and the sodium chlorid (NaCl) is dissolved to some extent. The sodium hydroxid formed burns the bark around the incision made in the affected part, and the sodium carbonate unaffected and the sodium chlorid spread completely over the surface of the affected part, thoroughly covering the same and the sodium chlorid is absorbed by the trunk of the tree and by this action stopping all further exudations of gums therefrom.

By applying this composition in the manner hereinbefore described the bark will gradually grow over the affected part and completely heal the tree in a short time, thus effectively eradicating the condition of gummosis.

After the abnormal condition has been completely eradicated a proper fertilization with regard to excessive moisture around the tree must be performed so that the condition will not again recur.

What I claim is:

1. A composition for treating diseases of trees composed of sodium carbonate (Na$_2$CO$_3$) 15%, calcium oxid (CaO) 65%, sodium chlorid (NaCl) 20%.

2. The herein described composition for treating trees consisting of calcium oxid, sodium carbonate, and sodium chlorid, substantially as specified.

In witness that I claim the foregoing I have hereunto subscribed my name this 1st day of May, 1912.

T. R. SATOW.

Witnesses:
K. KOJIMA,
T. R. SUZIEKI.